United States Patent Office 3,525,034
Patented Aug. 18, 1970

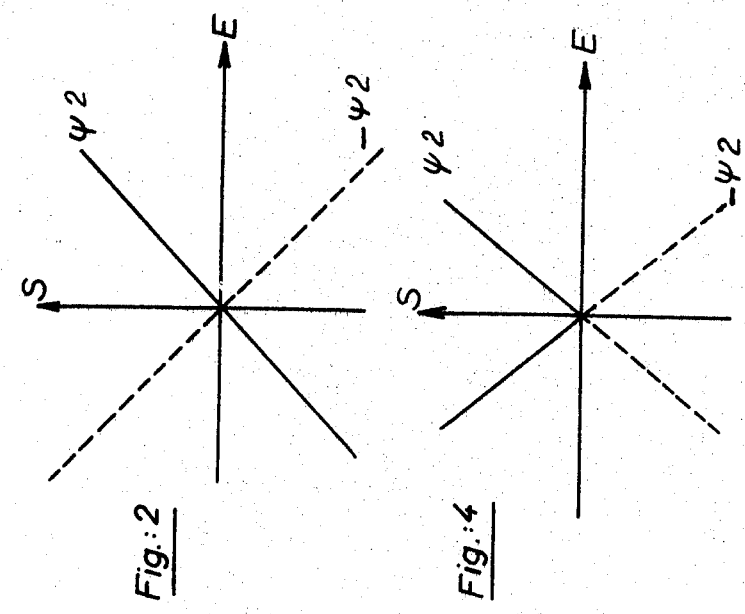
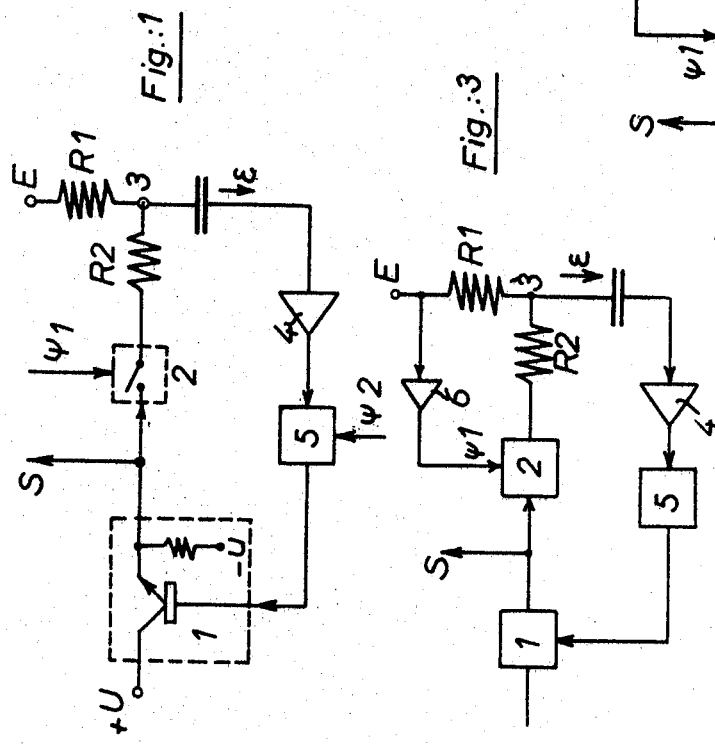

3,525,034
ELECTRONIC SYNCHRONOUS RECTIFIER CIRCUIT
Julien L. Gillionnier, Fresnes, Yves Jacquet, Paris, and Jean-Claude Pascal Kamiski, Marseille, France, assignors to Societe Nationale d'Etude et de Construction de Moteurs d'Aviation, Paris, France, a company of France
Filed July 13, 1967, Ser. No. 653,105
Claims priority, application France, July 26, 1966, 70,952
Int. Cl. G05f 1/64; G02p 13/24
U.S. Cl. 323—31     7 Claims

ABSTRACT OF THE DISCLOSURE

An electronic synchronous rectifying circuit for producing a direct current output signal proportional to the amplitude of a square waveform input signal, the sign of the direct current signal is dependent upon the phase of the input signal relative to the phase of a reference signal by chopping the direct current signal into square waveform signal which is in phase opposition with the square waveform input signal. The opposed square waveform signals are added to derive a resultant error signal which is amplified and demodulated by a demodulator, the demodulated signal controlling the magnitude direct current output signal.

---

This invention relates to an electronic synchronous rectifier circuit.

It is known to carry out arithmetical and other computing operations on quantities, which are in the form of direct voltages or currents, by transforming these quantities into square waveform voltages, these being easier to deal with. It is also known to indicate the sign of a quantity in terms of the phase of the signal representing it in relation to a fixed reference phase.

In order to control subsequent operations or indicate the result of the computation, it is sometimes convenient to convert the square waveform signal referred to above, the signal being of determinative amplitude and phase, back into a direct voltage (or current) signal of corresponding sign. This operation of recovering the quantity from the signal is known as "demodulation" and the obtaining of its algebraic value, which takes account of its sign, is referred to as "synchronous demodulation."

It is proposed in accordance with the invention that the last mentioned operations be carried out by the introduction of a device in the form of a synchronous rectifier circuit which is very simple to produce and whose mode of operation is virtually unaffected by variations in temperature throughout a wide temperature range of, for example, −50° C. to +150° C. The device is designed to deliver, in the manner aforementioned, a direct voltage proportional to the amplitude of a square waveform signal applied to its input, the sign of the direct voltage depending upon the phase of the input signal in relation to the reference phase.

The device according to the invention, receives a square waveform input signal and produces a direct current output signal of magnitude corresponding to the amplitude of the square waveform input signal, comprises a chopper controlled by a phase reference signal, which chops the D.C. signal to produce from it a square waveform signal which is in phase opposition with the square waveform input signal. The waveform signals are added and the resultant error signal is amplified in a high gain amplifier and then demodulated in a demodulator. The demodulated signal controlling the magnitude of the direct current output signal.

In one embodiment of the invention, the D.C. output signal has a polarity corresponding to the phase of the square waveform input signal relative to the phase of a reference signal and accordingly the demodulator is a synchronous demodulator which receives a control signal in the form of a square waveform voltage which is in the same or opposite phase with the input signal.

The invention has a number of possible applications, and can in particular be employed as a rectifier unit at the output of a computer cascade circuit handling square waveform signals, the circuit becoming operative each time control or output information, in the form of a direct voltage or current, is required (for example to operate a servo-valve).

The invention has numerous and considerable advantages, in particular:

very small drift within a very wide operating temperature range;
low output impedance;
excellent linearity, in the order of 1 in 1000;
an input impedance which will satisfy most applications (between 10 and 150KΩ for example);
the facility for rectifying a floating alternating voltage.

The following description which relates to the accompanying drawing will make clear, by way of example only, a preferred manner of carrying the invention into practice. In the drawings:

FIG. 1 is a general circuit diagram of one embodiment of circuit in accordance with the invention;

FIG. 2 illustrates the rectifying characteristic of the embodiment of FIG. 1;

FIGS. 3 and 4 respectively illustrate the general circuit diagram and rectifying characteristic of a second embodiment; and FIG. 5 illustrates a third embodiment of the circuit.

The circuit illustrated in FIG. 1 incorporates a regulated supply 1 which furnishes a direct voltage S chopped by a chopper 2 (the latter controlled by a phase reference signal $\psi_1$) to produce an alternating square waveform signal which is in anti-phase with the input signal E. The chopped signal output from the chopper 2 has the amplitude S, since chopping is effected in relation to earth potential.

This chopped signal is added to the signal which is to be rectified, the latter signal being fed in from the floating input E. Adding is effected at 3, the junction of two resistors R1 and R2 through which the input signal and the chopped signal are respectively passed.

At the output from the adder 3, an alternating square waveform signal of amplitude $$\epsilon = E \frac{R2}{R1+R2} - S \frac{R1}{R1+R2}$$

is obtained.

The error signal $\epsilon$ is amplified in an amplifier 4 of very high gain (in the order of from 3000 to 4000), then demodulated at 5 in a synchronous demodulator whose control signal $\psi_2$ is a square waveform voltage which is cophasal or in anti-phase with the input signal E.

The circuit above described affords a direct voltage output equal to S.

It is to be noted that because of the very high gain of the amplifier 4, the error signal $\epsilon$ has a very low amplitude in relation to the input signal and it can thus be stated that $$E \frac{R2}{R1+R2} = S \frac{R1}{R1+R2}$$

whence $$S = E \frac{R2}{R1}$$

It is also to be noted that the rectifier circuit may itself have an inherent gain and in this context it is merely necessary to make $R_2 \neq R_1$. To the same end, instead of chopping the full direct voltage S, only a certain proportion of it may be chopped, by the use of a potentiometer, for example.

It is evident that the temperature stability of the circuit is substantially dependent upon the temperature stabilities of the two resistors R1 and R2 of the adder. However, resistors are available whose temperature coefficient is in the order of $10.10^{-6}$ ohms/° C., so that for a temperature variation of 100° C., for example, a drift in the direct output voltage S of less than $2.02 \times 10^{-3}$ can be expected.

The rectifying characteristic of the circuit is therefore virtually linear, indicating direct proportionality between the D.C. output voltage S of the circuit and its A.C. square input voltage E. Assuming the control signal $\psi_2$ of the demodulator 5 has a given phase, the linear characteristic of the rectifier circuit is illustrated by the oblique full line in the first and third quadrants of the graph $S/E$. If now the phase of the control signal $\psi_2$ is reversed, the linear characteristic of the rectifier circuits becomes the dotted line in the second and fourth quadrants of the graph $S/E$.

In the embodiment illustrated in FIG. 3 a direct voltage equal to the absolute value of the square waveform input signal E is obtained, independently of whether the said signal is periodic or aperiodic.

The error signal $\epsilon$ amplified at 4 is rectified at 5 without regard to phase, this rectification furnishing a direct voltage which always has the same sign.

In order that the signal chopped by the chopper 2 will always have the opposite phase to that of the input signal E, the chopper 2 is controlled by a square waveform signal produced from the input signal by means of an auxiliary amplifier 6.

The rectifying characteristic thus has the two-section linear form illustrated in full line in the first and second quadrants of the graph $S/E$ in FIG. 4 for a given sign of the D.C. voltage supplied by the demodulator 5; if this voltage has the opposite sign, the characteristic $S/E$ becomes that illustrated in dotted line in the third and fourth quadrants of the figure.

In the third embodiment of the invention illustrated in FIG. 5, rectification is extended to the case in which the input signals are alternating signals of waveforms, which, though rectangular, may vary in size to a certain extent.

In this circuit, the control signals for the chopper 2, as well as the control signals for the demodulator 5, are both produced by the auxiliary amplifier 6 from the input signal E. In this case $\psi_1 = \psi_2$.

This direct current voltage output S will thus be equal to the amplitude of the square waveform alternating signal applied to the input.

In the foregoing, reference has been made to alternating square waveform signals. It is understood however, that this term is intended also to include signals of a generally rectangular form.

What is claimed is:
1. A regulating circuit for controlling the magnitude of a direct current source output signal in accordance with an alternating input signal, comprising;
   means for converting said direct current source output signal into an alternating signal in phase opposition to said alternating input signal,
   means for summing said alternating signal and said alternating input signal to generate an error signal, and
   means responsive to said error signal to generate a control signal for controlling the magnitude of said direct current source output signal.

2. A regulating circuit as in claim 1 wherein said means for converting is a chopper circuit stabilized by an alternating phase reference signal in phase opposition to said alternating input signal.

3. A regulating circuit as in claim 2 wherein said means to generate a control signal includes means for amplifying said error signal to provide an amplified error signal and means for demodulating said amplified error signal to provide said control signal.

4. A regulating circuit as in claim 3 wherein said direct current source is a transistor having a collector electrode connected to a source of voltage, a base electrode for receiving said control signal, and an emitter electrode connected to another source of voltage and to receive said control signal to provide said direct current signal of controlled magnitude.

5. A regulating circuit as in claim 3 wherein said means for demodulating is synchronized by a first alternating signal in phase coherence with said alternating input signal.

6. A regulating circuit as in claim 3 wherein said means for demodulating is synchronized by a second alternating signal in phase opposition with said alternating input signal.

7. A regulating circuit as in claim 5 further comprising means for generating said first alternating signal from said alternating input signal.

References Cited
UNITED STATES PATENTS

| | | | |
|---|---|---|---|
| 2,923,887 | 2/1960 | Aiken | 330—10 |
| 3,148,335 | 9/1964 | Young | 330—10 |
| 3,156,859 | 11/1964 | Cox | 330—10 X |
| 3,363,189 | 1/1968 | Oswald | 329—50 |
| 2,864,052 | 12/1958 | Searcy | 323—31 X |
| 3,205,424 | 9/1965 | Bates | 323—22 X |
| 3,426,266 | 2/1969 | Day et al. | 307—297 X |

J D MILLER, Primary Examiner

G. GOLDBERG, Assistant Examiner

U.S. Cl. X.R.

307—297; 321—18; 330—9